United States Patent Office 3,220,346
Patented Nov. 30, 1965

3,220,346
PLANOGRAPHIC PRINTING PLATE
Jerrol P. Strickler, Camden, Ohio, assignor to Millen Industries, Inc., New York, N.Y., a corporation of Delaware
No Drawing. Filed June 20, 1962, Ser. No. 203,728
5 Claims. (Cl. 101—149.2)

This invention relates to direct image coated paper base planographic printing plates and to a method of making such plates.

In general a direct-image coated paper planographic plate comprises a paper base preferably having high wet-strength properties, and on one side of the base a coating formed of finely divided mineral filler, for example, clay blanc fixe, titanium dioxide, or the like, in a water-insoluble, hydrophilic film-forming adhesive binder, the amount of the adhesive binder being substantially less than the amount of mineral filler so that the dried layer of coating will be microscopically porous. The conventional binder which is used may be any one of insolubilized casein, polyvinyl alcohol starch, carboxymethyl cellulose, hydroxyethyl cellulose, carboxymethyl starch, hydroxyethyl starch, polyacrylic acid or similar synthetic carboxylated polymer dispersions which have good adhesive characteristics, such as copolymer of vinyl chloride-vinyl acetate-maleic anhydride, copolymer of acrylonitrile-ethyl acrylate-acrylic acid, copolymer of butadiene-styrene-acrylic acid, copolymer of methyl acrylate-styrene-acrylic acid, and copolymer of vinyl acetate-ethyl acrylate-crotonic acid. Generally, for each 100 parts by weight of mineral filler or pigment there is used from 10 to 50 parts by weight of adhesive binder.

The roughness due to the large ratio of pigment employed insures adequate anchorage of images applied by typewriter ribbon, crayons, or the like. This same roughness, however, tends to make the unimaged background more liable to "toning" or contamination by ink during the printing operation.

To prevent ink contamination in unimaged background areas, a water-soluble zinc salt, such as zinc acetate, as disclosed in U.S. Patent No. 2,534,650, is incorporated in the surface pores of the highly mineralized coating, the zinc reacting with the acid phosphate of the aqueous lithographic solution to form an insoluble gel which stays clean during the printing operation. The life of the plate or master is, however, much less than in instances where the zinc acetate is not used since the gel which is formed wears away faster than the underlying mineralized coating. The master is imaged generally with a typewriter utilizing a ribbon saturated with greasy ink or with a wax transfer coating. Attempts have been made to prolong the life of the direct-image paper master by slowing the wearing tendencies of the zinc acetate filling. These attempts such as disclosed in U.S. Patent No. 2,635,537, are based upon the use of mixtures of zinc acetate with alkali-metal acetate or ammonium acetate to buffer the zinc acetate and to provide a more widely useful range of gel reaction leading to longer life.

The incorporation of the buffered zinc acetate requires additional adhesive binder in order to anchor this agent against mechanical washing during the rolling movement of the printing press. The microporous, rough structure of highly mineralized coating is altered in a manner which prevents adequate "tooth" for imaged impression from the typewriter and can cause difficulty with erasures and corrections due to removal of part of the stabilizing zinc acetate coating when such erasure is made.

It will therefore be seen that the main disadvantage of the direct-image coated paper planographic masters is that they are incapable of use in the long run category, no more than several thousand copies being printed in the hand of a skilled operator. This disadvantage is not one which detracts from the printing results which can be achieved. Although commercially available coated paper masters have been designed for use with the different kinds of typewriter ribbons, e.g., the greasy ink ribbon and the single-use wax ribbon such as the Mylar "carbon" ribbon, there are no coated paper masters usable with both kinds of ribbons which, at the same time give longer printing life.

It has been suggested in U.S. Patent No. 2,778,301 that the selection of the mineral pigment is of great importance in achieving higher printing production rates and blanc-fixe serves as the mineral filler instead of clay in order to produce longer printing life, this filler being dispersed in ammoniated casein containing a small proportion dimethylol urea as a hardener, 100 parts of filler to 20–25 parts of binder being used. The coated paper planographic printed plate of the patent is useful in letterpress or with a photo-image on a photo-sensitive coating of bichromated albumin, or can also be used for making a "Xerox" image (see Journal of the Optical Society of America, vol. 38, No. 12, pages 991–998) by electrostatically transferring to the plate surface an image of fusible resinous powder which is subsequently heated to fuse the image to the plate surface.

The present invention departs from the concept which is recommended in Patent No. 2,778,301, of utilizing non-hydrated blanc-fixe pigment and further departs from the concept stated in U.S. Patent No. 2,635,537 of employing a buffered zinc acetate top-coating by adopting zinc oxide as an essential ingredient of the microporous, highly mineralized coating in combination with zinc treated casein as the adhesive binder and in utilizing colloidal silica of special composition as the wash coating to reduce "toning," e.g., to prevent discoloration of the unimaged portions of the paper when used for its express purpose as a direct-image coated paper planographic printing master.

In a preferred formulation there is employed for the highly mineralized microporous coating a coating composition containing 75 parts of clay and 25 parts of zinc oxide as the mineral component and 25 parts of zinc treated casein as the binder, these ingredients mixed in water to a solid content of about 25–45% prior to coating.

The term "clay" as used herein and generally in the paper coating industry refers to china clay or kaolin of which the chief constituent is hydrous aluminum silicate, e.g., kaolinite.

The zinc treated casein, which is an essential binder component of the present invention is a zinc ammonia casein composition. This composition may be prepared by mixing together zinc oxide or zinc hydroxide, a casein solution in water and ammonia water. The casein is brought into solution by treatment in the usual manner with sodium hydroxide, sodium carbonate, or preferably, with ammonia water. Only a small amount of zinc is used in making the zinc ammonia casein complex for the present coating; for example, 1 to 6 percent zinc on the weight of the casein gives excellent results.

The zinc ammonia casein complex containing from about 1 to about 6% of zinc metal by weight of the casein is available commercially in the form of a dry powder, usually spray-dried under carefully controlled temperature conditions so as to provide good water solubility. A commercially available casein, which is readily soluble up to 50% of the dry casein in water or in dilute ammonium hydroxide solution is designated by the trade number "FF-30-Z Casein" and is made by the Borden Company.

In the event that the casein is to be manufactured in the form of the zinc complex and used directly in solution, the method of preparation is as set forth in the example at page 2, column 1, lines 10–22 of the patent to Bradner, No. 2,346,812, dated April 18, 1944, and there is obtained a 55% solution of the complex, and to this complex in solution there are added 3 parts of kaolinite to each part of zinc-casein in the slurry and 1 part of dry zinc oxide for each part of casein in the slurry.

As a general rule, the coating viscosity is adjusted to a consistency of a thick cream. The consistency depends upon the amount of ammonia added and the solids content of zinc-casein complex prior to adding the mineral pigment. By diluting with 10 to 12% ammonium hydroxide, the viscosity may be thinned during or after admixing with the zinc oxide and clay mineral pigment to provide the desired coating weight on the paper base.

In manufacturing the zinc-casein complex, other zinc compounds than zinc oxide may be used, such as zinc carbonate or zinc cyanide.

In the new combination of the zinc casein and zinc oxide filler used, the amount of zinc oxide being from 50% to 150% by weight of the zinc treated casein, a surprising coating improvement is achieved to eliminate the "toning" of the unimaged background in the direct-image coated paper master, the improvement being achieved in the presence of a major proportion of clay as the principal filler. The present use of clay is in contrast to the teaching of eliminating clay in the microporous mineralized coating which is taught in U.S. Patent No. 2,778,301, this patent substituting blanc fixe for clay.

Accordingly, an entire new concept of both mineral pigment and of zinc-modified casein binder is proposed by the present invention for the novel microporous, "toothed" coating which is utilized as the base coat of the direct-image coated paper master for receiving ordinary typewriter impression. As a result of the new binder and new mineral pigment formulation, a harder, more impenetrable microporous surface base coating is achieved, this in contrast to the conventional casein formulation for the base coat utilizing either blanc fixe or clay filler. The surface of the base coating is more immune to fingerprints.

An essential feature of the invention is the provision of a mechanically resistant microporous hydrophilic top coating consisting essentially of an alkali stabilized colloidal silica sol which is applied to the zinc-caseinate-zinc oxide base coating.

This alkali stabilized colloidal silica sol is a unique material to provide a scum-resistant top coat and does not resemble any other common inorganic colloidal silica dispersion. A very important property of such a colloidal silica is that the silica is irreversibly precipitated in the top coating to form a permanent resistant layer. Once the colloidal silica is dispersed, in water for example, and dried it becomes irreversible and cannot be redispersed.

A preferred colloidal silica is that which is marketed under the trade names: "Nalcoag 1050" by National Aluminate Company; "Ludox" by E. I. du Pont de Nemours and Company and "Syton S-20" by Monsanto Chemical Company.

Generally, the alkali-stabilized colloidal silica is in the form of dispersed particles having a particle size of 1 to 100 millimicrons and having the alkali substantially all outside of the silica particles.

The preferred colloidal silica is composed of 29% to 31% $SiO_2$, 2.29% to 0.39% $Na_2O$ and a maximum of 0.15% sulfates as $Na_2SO_4$, and is obtainable in the form of a water slurry containing about 50% solids at pH 9.0. The silica particles are extremely small, ranging from about 0.01 to 0.03 micron in maximum dimension. The particle size is determined as the average size of particle present when the solution is diluted to about 0.1% $SiO_2$ with water and dried in a very thin layer.

The present type of colloidal silica is described in detail in U.S. Patents Nos. 2,244,325, issued June 3, 1941, 2,574,902, issued November 13, 1959, and 2,597,872, issued May 27, 1952, and may be prepared by passing a silicate through an ion exchange resin to remove the alkali as described in U.S. Patent No. 2,244,325. If all of the alkali is removed from the silicate, the resulting sols are not stable, but they can be stabilized by adding a small amount of alkali such as $Na_2O$ or $K_2O$.

The silica-alkali ratio varies from about 60:1 to about 130:1, the dispersion containing discrete silica particles, having a molecular weight as determined by light scattering of more than one-half million. It has a relative viscosity, at 10% $SiO_2$, from 1.15 to 1.55 and generally contains from 20% to 35% by weight $SiO_2$. The alkali present is not uniformly distributed throughout the $SiO_2$ particles as it is in conventional silicate such as water glass, but is substantially all outside the $SiO_2$ particles and acts as a stabilizer for the $SiO_2$ sol to prevent condensation of the $SiO_2$ particles.

The essential colloidal silica top coat of the invention must be used in an aqueous acid environment in order to provide the desired adhesive bond to the zinc caseinate with zinc oxide or zinc oxide-clay base coating. This acid medium appears to accelerate the deposition of colloidal silica and by selecting as the acid a volatile organic acid, there is achieved a uniform coating which completely covers the base coating to provide a permanent tightly bonded outer hydrophilic surface uniquely adapted for obtaining high production runs of the planographic printing plate of the present invention. A preferred volatile acid is an organic acid such as acetic acid, formic acid, propionic acid, butyric acid or the like, these acids being readily evaporated at room temperature to prevent contamination of the unique silica top coating which can impair the printing qualities of the paper plate.

Ordinarily, a concentration of about 3% to about 15% of volatile acid in water is sufficient to produce superior covering power in extremely thin films of colloidal silica which are continuous unbroken films due to the avoidance of interfering materials which could leave a residue. If ordinary sodium silicate containing high amounts of sodium oxide were employed such as is found in water glass, the amount of salt residue, e.g., sodium acetate in the case where acetic acid is used to acidify "Ludox" colloidal silica, the resultant top coat is completely unsatisfactory because the film is not continuous after it has received its first contact with water or even moisture in the atmosphere. The substantial quantities of sodium salt of the organic acid which remain as residue in the silica film in the case that water glass is used as the coating, causes breaks in the film to appear, makes the film discontinuous, and reduces the hardness characteristics of the plain product to such a degree that it cannot be used in even normal production runs. It is only the colloidal silica film which provides a permanent coating possessing the desired hydrophilic properties for high production printing runs and which gives the life of the printing plate which is desired.

It is within the scope of the invention to utilize hardening resins in minor amounts with the colloidal silica provided that the essential film former of the top layer is the inorganic colloidal silica material as a continuous film. Thus, minor amounts, e.g., up to 35% by weight of colloidal silica of urea formaldehyde resin, melamine formaldehyde resin or mixtures of urea formaldehyde resin and melamine formaldehyde resin may be added for the advantage of aiding the final manufacturing step, the step of supercalendering the plate to achieve high density and high strength in the final product.

It is a desirable feature of the supercalendering operation that the top coat or coatings of colloidal silica which are applied be permitted to age in order to achieve the maximum strength characteristics of the coated paper product.

In contradistinction to prior methods which have employed colloidal silica as a filler in minor proportions with a major proportion of an organic binder, the present invention employs colloidal silica as the essential item in the absence of any hydrophobic or oleophilic component. This means that the drying and setting characteristics for achieving a permanent bond are exclusively those of colloidal silica, which in the environment of the present invention, requires about 4 to 10 days to achieve a maximum degree of permanence.

Only those binders such as urea formaldehyde or melamine formaldehyde which are relatively non-hydrophobic can be used and even then in minor proportion. Oil modified melamine resin or oil modified urea resin is not suitable even if the setting time of 3 to 4 days is thereby overcome. The beneficial characteristics of the printing plate which are due to the hydrophilic coating consisting essentially of colloidal silica are the enhanced reproduction of half-tones due to the hard surface provided by colloidal silica which limits penetration of the half-tone image, the better immunity to fingerprints and the better erasure characteristics because of the hardness of the surface film.

Despite the increased hardness, the thinness of the silica film and its surprising flexibility overcomes the expected wrinkling of the plate which is observed when hard organic coatings are used as the top layer. One ordinarily associates the harder top coating with a poorer acceptance of the image, but the unique hydrophilic characteristics due to the inorganic silica coating produces improved preprinting characteristics because the image is accepted faster, does not separate and is, therefore, ready for use in minimum time for either offset or letter press.

Due to the substantially wholly inorganic nature of the top coat, even in instances where minor amounts of urea or melamine resins are used, the printing plate can be subjected to very high temperatures, e.g., temperatures of 300° to 600° F. and because of the zinc oxide-zinc caseinate base coating the printing plate of the invention has outstanding utility in the field of xerography. The present plate has an improved affinity for the selenium of the xerographic machine and, therefore, accepts image more readily and has less tendency to pick up background.

A new coaction exists due to the cooperation between the silica top coat continuously overlying the zinc oxide-zinc caseinate base coat, particularly in respect to the outstanding resistance to pickup of atmospheric moisture. Most casein clay coatings pick up moisture from the atmosphere to a degree which has seriously impaired the use of these coatings in paper plates of the prior art. The present combination of coatings provides a product which does not absorb moisture, which has extreme resistance to impact during printing operations or as well as during preparation of the plate. As a result, outstanding printing is achieved.

The following examples illustrate the materials and steps which may be used in carrying out the invention. The particular ingredients and steps hereinafter described, while representing the forms of the invention at present preferred, and listed in the order of preference, are of course, only a few of many possible variations, depending upon the circumstances and requirements of the particular case:

*Example I.—Base coating composition*

The paper selected for making the paper base planographic printing plate is a high strength paper identified as International Chart Stock of the International Paper Company, and may be used in any one of several grades: 24 x 36–50 grade being used for medium run and 24 x 36–41 being used for short run.

The paper is given a coating of the following composition to make a white colored base coat.

| Component: | Parts by weight |
|---|---|
| Clay (paper maker grade) | 75 |
| Zinc oxide (finely divided) | 25 |
| Zinc caseinate containing 4% Zn as zinc metal | 25 |

The foregoing composition is dispersed in water using by weight 10 parts of water to 3 to 4 parts of bast coat composition and the coating applied in a standard coating machine.

To manufacture a yellow colored base coating Hansa yellow dye is added in the amount of about 0.5% by weight of the base coating mixture, the dye being mixed with the base coat and dispersed intimately in a ball mill.

To prepare a blue colored base coating, cyan blue dye is used in similar amount. The clay and zinc oxide components are preferably added after the casein is dispersed in water. To facilitate solution 10–12% ammonium hydroxide is present in the water used and about 1 part of casein to 4 parts of water are mixed first and cooked before clay and zinc oxide are added.

The composition is ball milled for at least 30 minutes before diluting with water or dilute ammonium hydroxide to desired coating consistency which permits the thickness of the base coat to be adjusted from 0.5 mil up to about 4 mils, the more dilute coating solution (down to 10% solids) giving very thin coatings. Generally a coating thickness of about 1 to 2 mils is adequate for medium and high run products. The coated paper is permitted to stand for 1 to 2 weeks.

In an alternate coating composition a small amount of binder is added, e.g., melamine formaldehyde resin in amount of 3 parts of resin to 100 parts of base coating composition. The melamine formaldehyde resin is preferably added in the form of a dispersion in water or in butanol-water mixture. The total resin solids and amount used of the resin dispersion are such as to give 3 parts of dry melamine resin or each one of the parts of base coating solids in the above formula, e.g., total of clay, zinc oxide and zinc caseinate.

In another embodiment there may be added 10 parts of colloidal silica of the Ludox type with 3 parts of melamine resin for each 100 parts of base coat composition. This embodiment of the base coating has the advantage of improving adhesion of the top coating consisting of colloidal silica.

It is a characteristic of the invention that no other mineral filler than zinc oxide or hydrophilic clay is used in the base coating, the colloidal silica addition being solely for the purpose of improving the dispersion of the clay and zinc oxide in the zinc treated casein and for improving adhesion to the top coat. Because of this limitation to eliminate other mineral fillers and because of unique restriction to only two organic binders, urea formaldehyde resin or melamine formaldehyde resin, there are fewer composition variables to control and a greater uniformity of printing performance can be achieved. No oil soluble fatty products are contained in the base coating composition or the top coating composition. Except for the unique casein complex with zinc the base coat and the top coat are almost completely inorganic and both coatings are hydrophilic.

As a result the base coating contains a maximum of not more than about 25% of binder which is essentially casein and less than 5% of organic binder such as urea formaldehyde resin which is hydrophilic and oil free.

It is a characteristic of the base coat and the top coat of highly inorganic character that it should be calendered under heavy pressure, e.g., super-calendered between the application of the base and top coatings in order to develop the best surface characteristics. Flexibility of the coating is imparted essentially from the mineral components and especially from the zinc oxide and the casein which is modified with zinc in the base layer. Adhesion of a very thin colloidal silica top coating is aided by super-calendering the doubly coated stock after the colloidal silica top coating has set. Colloidal silica sets to a hard flexible continuous film in from 3 to 14 days. Aging of the base coating for 1 to 2 weeks followed by super-calendering, application of the top coat, aging from 1 to 2 weeks and by a final super-calendering step permits the achievement of absolute uniformity in printing characteristics of the finished plate.

The finished super-calendering paper after aging is tested in storage and is found to give reproducible results even after 6 months of aging. This is in contrast with non-uniformity which is difficult to control when resinous oil modified binders are employed or when cellulose derivatives are employed as the binder. The top coating which is employed in this example is made of the following composition—

| Component: | Parts by weight |
|---|---|
| "Ludox" colloidal silica | 5 |
| Acetic acid | 5 |
| Water | 90 |

Ludox silica in this example contains 30% solids as $SiO_2$, has a pH of 8.4 and contains about 0.4% $Na_2O$ and 0.1% $Na_2SO_4$; all of the alkali being outside the silica particles. The molecular weight is about 500,000 and the average particle size is about 0.01–0.03 micron in diameter.

The foregoing solution produces a top coating about 0.05 mil thick after calendering.

Thicker films, e.g., 0.1 mil thick can be produced by multiple coating operations following conventional procedures.

*Example II*

The procedure of Example I was repeated except that instead of using 25 parts of zinc oxide and 75 parts of clay, 50 parts of zinc oxide and 50 parts of clay were used with the same zinc caseinate. In this example the zinc caseinate which was used was obtained in the grade known as Borden FF–30–Z casein.

Otherwise the same coating, aging, and calendering steps were employed to produce an excellent printing plate material in accordance with the invention.

In the calendering operation of Example I and Example II carried out at high pressure with cotton and metal rolls, the coated side was put into contact with the metal roller.

*Example III*

In this example the procedure of Example I was repeated except that urea formaldehyde resin was used in an amount of 4 parts per 100 parts of coating composition instead of melamine formaldehyde resin used in the alternate embodiment of Example I. An excellent printing plate was produced having good hardness, good top coat adhesion and good printing properties.

*Example IV*

In this example the procedure of Example I was repeated except that equal parts of urea formaldehyde resin and melamine formaldehyde were used to form a mixture of a non-oily resinous binder. This binder mixture was added in an amount of 4 parts of the mixture to each 100 parts of the base coating composition. 10 parts of "Syton C–15" containing 15% of colloidal silica having a molecular weight of about 500,000 and particle size of about 0.02 microns was added to the mixture of urea and melamine resins and the base coating compositions. This resin-modified base coating composition, after ball-milling for 2 hours, was roller-coated on the paper stock. A top coating of "Syton C–15" in 5% acetic acid was applied after the base coating had been aged for one week and super calendered. An excellent direct-image plate was produced.

When more than 10% of mixed resin (UF and MF), or when more than 10% of either of these resins, were added to the base coating, the electrical properties, e.g., affinity for selenium of the direct image plate, was substantially reduced.

The foregoing examples illustrate the preparation of direct-image coated paper planographic plate utilizing chart stock from a commercial source. It is known in the art that the chart stock when primed with a suitable synthetic resin coating on the functional side can be given much longer service life.

The product of the foregoing examples have a service life of about 5,000 to 20,000 impressions, the limiting factor being the characteristics of the paper base. The service life can be extended to 50,000 to 100,000 runs by applying a synthetic resin emulsion sealing coat to the stock which has the function of promoting adherence to the active coating for printing, e.g., the zinc-caseinate, zinc oxide-clay filler.

A particularly desirable coating for the functional side of the sheet is a combination of resinous materials including two parts of Dow 630 (48% solids) and one part of emulsion M (Koppers) (40.9% solids). The Dow 630 resin emulsion is based upon a copolymer of butadiene and styrene, while the Koppers emulsion is based upon polystyrene. The proportions of butadiene and styrene in the Dow emulsion are 60 parts of styrene to 40 parts of butadiene. The combination of the high styrene copolymer and polystyrene provides a "hard tooth" sealing coating on the chart paper which seals the paper and due to the hardness of the polystyrene gives long wearing characteristics to the finished product. It is an advantage of this sealer coating that the penetration of the active zinc caseinate coating is limited.

A thin hard sealer coating of the order of ½ to 1½ mils thickness permits a thinner zinc caseinate coating which has all of the advantages of the thicker zinc caseinate coating and exhibits longer image-reproducing life in high quality image production.

Although the reason for better wearing is not completely understood, it is possible that better mechanical adherence is achieved because of the hard sealing layer which is mechanically tightly bonded to the zinc caseinate coating and the long wearing effect appears to be associated with the higher pressures which can be achieved during the super-calendering steps.

Suitable synthetic resin coatings may be based upon hard methacrylate polymers and other synthetic polymers of the vinyl chloride, acrylic and butadiene type. Each of these copolymers may be blended with polystyrene to desired hardness.

Examples of copolymers which may be used alone or in combination are copolymer of vinyl chloride-vinyl acetate-maleic anhydride, copolymer of acrylonitrile-ethyl acrylate-acrylic acid, copolymer of butadiene-styrene-acrylic acid, copolymer of methyl methacrylate-styrene-acrylic acid, and copolymer of vinyl acetalethyl acrylate-crotonic acid.

I claim:

1. A direct-image paper base planographic printing plate comprising a high wet-strength paper base of chart stock primed with a synthetic resin coating consisting of a mixture of a copolymer of butadiene and styrene with polystyrene, said paper base serving as the support of said plate, a continuous microporous intermediate coating on said base consisting of 10 to 50 parts of adhesive binder per 100 parts of mineral pigment, said mineral pigment consisting of from about 20 to about 40 parts of zinc oxide and from about 80 to about 60 parts of hydrous clay, said adhesive binder being a zinc ammonia casein complex containing from about 1 to about 6% of zinc metal by weight of the casein, and a continuous top coating over said intermediate coating consisting of alkali-stabilized colloidal silica which has been acidified and then calendered, said silica having a particle size of 1 to 100 millimicrons, a molecular weight as determined by light scattering of more than one-half million, the alkali for stabilizing said colloidal silica being all outside the silica particles and having a silica to alkali ratio of from about 60:1 to about 130:1, said silica being mixed with up to 35 parts of synthetic resin per 100 parts of silica, said resin being selected from the group consisting of urea-formaldehyde, melamine formaldehyde and mixtures of urea-formaldehyde and melamine formaldehyde, said microporous intermediate coating providing adequate tooth for imaged impression from the typewriter and resisting discoloration of the unimaged portions when used as a direct-image printing master.

2. A planographic printing plate as claimed in claim 1 wherein the mineral component of said intermediate coating contains 75% of china clay and 25% of zinc oxide.

3. A paper planographic printing plate as claimed in claim 1 wherein said adhesive binder in said intermediate coating is modified by adding up to 3 parts of synthetic resin per 100 parts of the coating composition, said synthetic resin being selected from the group consisting of urea formaldehyde, melamine formaldehyde and mixtures of urea formaldehyde and melamine formaldehyde.

4. A method of making a direct image paper base planographic printing plate comprising coating the entire surface of a high wet-strength hard synthetic thermoplastic resin-primed paper base support with a first coating composition to provide an intermediate microporous layer, said coating composition consisting of 10 to 50 parts of adhesive binder per 100 parts of mineral pigment, said mineral pigment consisting of from about 20 to about 40 parts of zinc oxide and from about 80 to about 60 parts of hydrous clay, said adhesive binder being a zinc ammonia casein complex containing from about 1 to about 6% of zinc metal by weight of the casein, thereafter applying a second coating over the intermediate microporous coating to give a hard top coating, said second coating consisting of alkali-stabilized colloidal silica with up to 35 parts of synthetic resin per 100 parts of silica, said synthetic resin being selected from the group consisting of urea-formaldehyde, melamine formaldehyde, and mixtures of urea-formaldehyde and melamine formaldehyde, said silica having a particle size of 1 to 100 millimicrons, a molecular weight as determined by light scattering of more than one-half million, the alkali for stabilizing said colloidal silica being all outside the silica particles and having a silica to alkali ratio of from about 60:1 to about 130:1, the silica being deposited from aqueous colloidal dispersion at alkaline pH by treating with volatile acid, evaporating said top coating and calendering the coated sheet under high pressure.

5. A method of making a direct-image paper planographic printing plate as claimed in claim 4 wherein said paper base support is primed with a hard, brittle, thin coating of synthetic thermoplastic resin to seal the paper base and thereby provide longer service life, said synthetic resin being selected from the group consisting of copolymer of vinyl chloride-vinyl acetate-maleic anhydride, copolymer of acrylonitrile-ethyl acrylate-acrylic acid, copolymer of butadiene-styrene-acrylic acid, copolymer of methyl methacrylate-styrene-acrylic acid, copolymer of vinyl acetate-ethyl acrylate-crotonic acid, copolymer of vinyl chloride-vinyl acetate, polymethyl methacrylate, polystyrene copolymer of butadiene and styrene and mixtures of these copolymers.

References Cited by the Examiner

UNITED STATES PATENTS

| | | | |
|---|---|---|---|
| 2,280,986 | 4/1942 | Toland et al. | 101—149.2 |
| 2,346,812 | 4/1944 | Bradner | 117—64 |
| 2,397,616 | 4/1946 | Mullen | 101—149.2 |
| 2,693,145 | 11/1954 | Mullen | 101—149.2 |
| 2,778,301 | 1/1957 | Brinnick | 101—149.2 |
| 2,941,466 | 6/1960 | Newman et al. | 101—194.2 |
| 3,017,826 | 1/1962 | Salzberg | 101—149.2 |
| 3,020,839 | 2/1962 | Richard | 101—149.2 |
| 3,055,295 | 9/1962 | Perkins | 101—149.2 |

ROBERT E. PULFREY, *Primary Examiner.*

DAVID KLEIN, *Examiner.*